Dec. 6, 1949     R. HARDY     2,490,051
RADIOELECTRIC FINDING AND TELEMETERING SYSTEM
Filed May 28, 1943     2 Sheets-Sheet 1
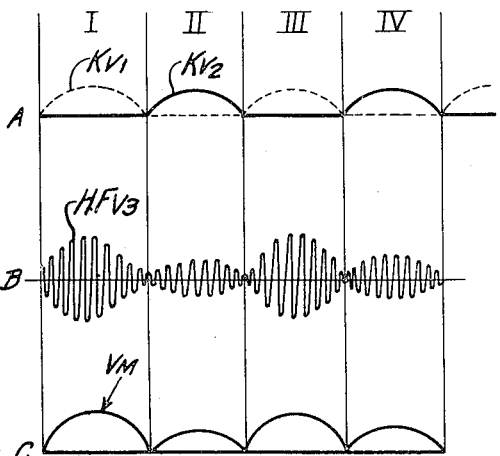
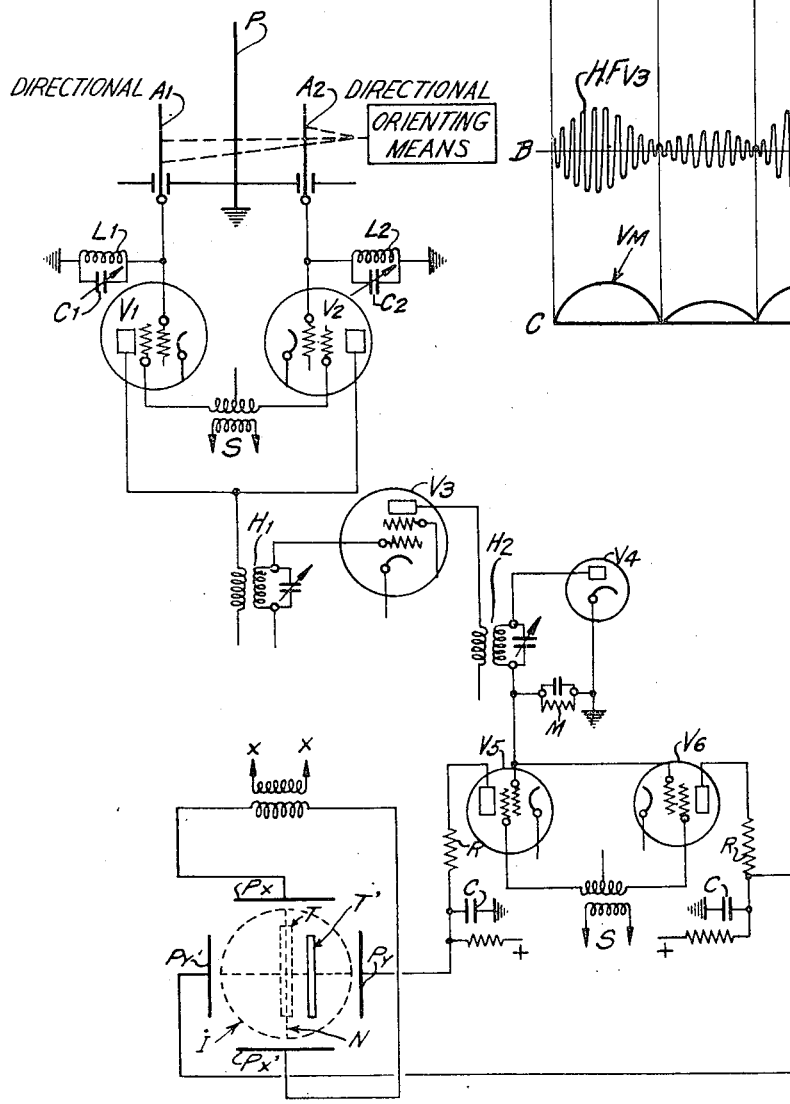
INVENTOR.
RENÉ HARDY
BY
Edward D. Phinney
ATTORNEY

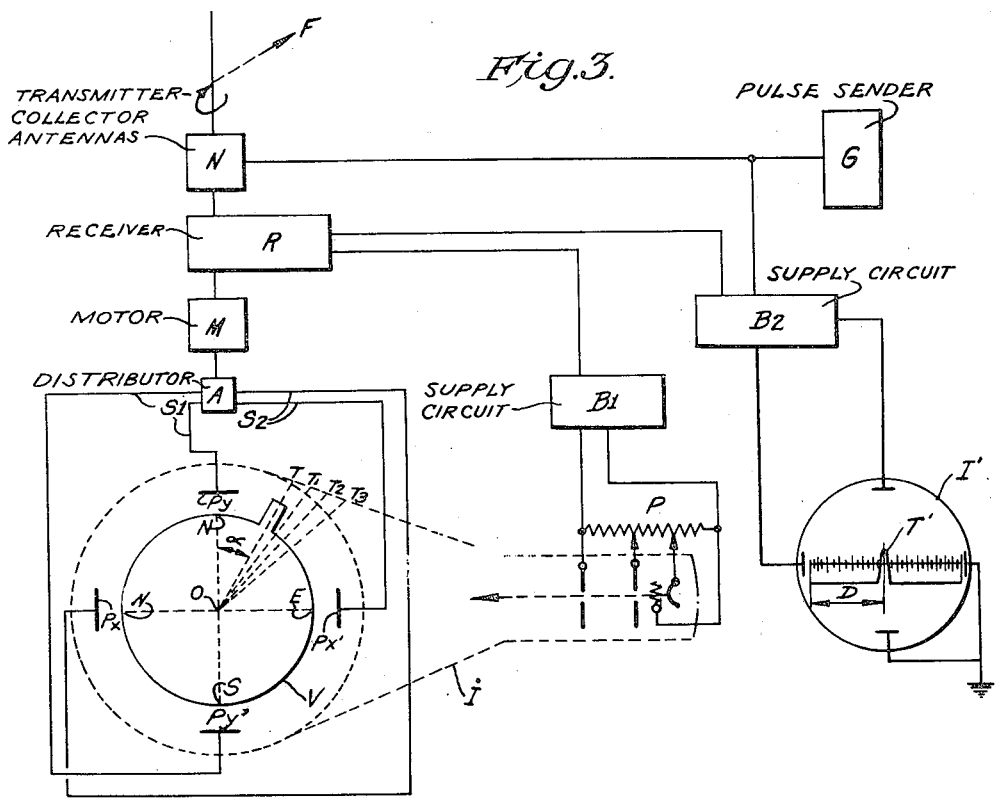
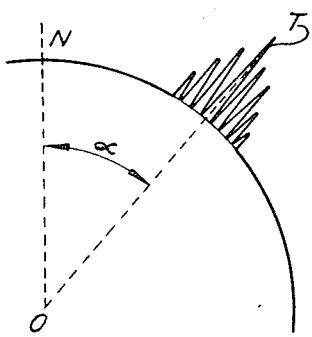
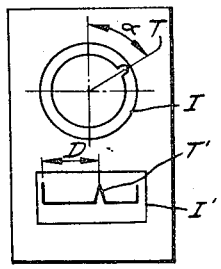

/ Patented Dec. 6, 1949

2,490,051

UNITED STATES PATENT OFFICE 2,490,051

RADIOELECTRIC FINDING AND TELE-METERING SYSTEM

René Hardy, Lyon, France, assignor to International Standard Electric Corporation, New York, N. Y.

Application May 28, 1943, Serial No. 488,874
In France December 20, 1940

Section 1, Public Law 690, August 8, 1946
Patent expires December 20, 1960

6 Claims. (Cl. 343—11)

1

The present invention relates to radioelectric finding- and telemetering-systems.

According to one of its aspects, the invention is intended particularly to provide radioelectric finding-systems for determining with precision the direction of a Hertzian-wave transmitting source or of an obstacle, such as an airplane, from which a brief signal is reflected back.

Such radioelectric direction-finding systems also permit of obtaining by Hertzian waves the distance of a detected object in addition to determining its direction. However, in order to use radio direction-finders for this double determination of direction and distance, it is necessary to provide two or more radio direction-finders arranged at a base and to centralize the information conveyed by them so as to determine by triangulation the distance and the direction of a detected object, Hertzian source, or obstacle with respect to the centralizing station.

According to another of its aspects, therefore, the present invention is intended to provide direction- and distance-metering systems or radioelectric goniotelemeters which eliminate the necessity of having an observation base using two or more radio direction-finding stations but permitting on the contrary of obtaining directly at one radio-direction-finding station the two desired indications of direction and of distance.

According to certain features of the invention, a radio direction-finding system of the type in which the direction e. g., of an echo source is given by a maximum or minimum reception over a directional antenna-system, comprising two antennas separated by a Hertzian screen, the assembly being orientable and connected to an amplifying-system differentially feeding an inertialess indicator, such as a cathode-ray tube, the amplifying-system being arranged to amplify alternately the energy coming from the two antennas.

According to other features of the invention, a radio goniotelemetric system comprises a slowly rotating transmitter-receiver assembly arranged to control simultaneously two indicating-devices, one indicating direction and the other indicating distance, in order to reveal at all times the presence of an obstacle in space and indicate the direction and the distance of that obstacle without interrupting the continuous watch of the space field.

These objects and features, as well as still others, will be set forth in detail in the description that follows, given with reference to the accompanying drawings, in which:

Fig. 1 shows schematically an embodiment, incorporating features of the invention, of a radio direction-finder having a differential indicator;

Fig. 2 shows curves used in explaining the operation of the system shown in Fig. 1;

Fig. 3 shows schematically another embodiment, according to certain features of the invention, of a radio direction-finder which also provides for measuring distances;

Fig. 4 shows a portion of the cathodic screen of the direction-indicator shown in Fig. 3; and Fig. 5 shows schematically a possible arrangement of the double indicating-device shown in Fig. 3.

One plan, in general, is to provide two directional antennas, one on each side of a static screen and connected one each to two tuned grid circuits of two different tubes. Alternating voltage from a transformer is connected to the screen grids of the same tubes by a sort of push-pull arrangement in such a manner that the tubes will be effective alternately. The object of this is to separate two antenna circuits so that the radio frequency will be brought out in groups of cycles corresponding to each half cycle of the alternating voltage. The output of the two tubes is connected to a cathode ray indicator by way of an amplifier. The antennas can be oriented until the two alternate sets of waves are equal in amplitude at which time the antennas will be pointed directly at the source of the waves.

In the radio direction-finder shown schematically in Fig. 1, A1 and A2 designate two directional receiving-antennas arranged on each side of an electromagnetic and static screen P mechanically integral with antennas A1 and A2. This antenna system can be oriented at will. Each antenna A1 and A2 therefore has a different reception-pattern but the orientation of the assembly provides equal reception in a quite definite direction with respect to the Hertzian-wave or echo source whose distance it is desired to determine.

Antennas A1 and A2, whose wave-structure may consist of any appropriate wave-collector structure, are connected respectively to the control grids of amplifier tubes V1 and V2, which are provided with tuned grid circuits L1, C1 and L2, C2, respectively. The other supply- and biasing-circuits of tubes V1 and V2 are not shown, in order to simplify the drawing, it being assumed that they are well known in themselves. The V1—V2 assembly behaves like an asymmetrical amplifier. Tubes V1 and V2 are shown as being screen-grid tubes and the gain of V1 and of V2 is variable, being controlled by the sinusoidal voltage of a generator (not shown) applied to these screen-grids across transformer S. The sinusoidal voltage applied by S serves to cause tubes V1 and V2 to operate alternately.

At A in Fig. 2 is shown the gain variation of tubes V1 and V2. When V1 amplifies, V2 does not operate, and vice versa. The dotted curve marked Kv1 is the gain curve corresponding to V1, and the solid-line curve marked Kv2 is that corresponding to V2. It will be seen that each tube amplifies alternately during one-half period of the sinusoidal voltage applied by S.

The plate-circuits of tubes V1 and V2 supply in common another amplifier-stage comprising only one tube (V3) across a tuned-secondary transformer H1. Tube V3 also is shown in the form of a screen-grid tube, although it may be an amplifier tube of any suitable type.

At B in Fig. 2 is shown the high-frequency current passing through amplifier V3, assuming that the reception over antenna A1 be stronger than over antenna A2. The result is that during all the half-periods that V1 has a high gain, current HFv3 will be substantial, while it will be of less value during the other half-periods, when V2 will have a high gain, because A2 receives less energy than A1.

The current amplified by V3 is impressed across the primary of a tuned-secondary transformer H2 to a diode detector tube V4. This current will have a profile similar to the envelope of current HFv3. At C in Fig. 2 curve Vm represents the voltage appearing in the tuned circuit M of diode V4. This variable voltage appearing in M is applied in parallel to the control grids of two amplifier tubes V5 and V6 constituting the output stage. The screen grids of these two tubes are modulated at the same time as those of the two input tubes V1 and V2 by the same sinusoidal voltage as indicated by the transformer bearing the same reference character S. It is obvious, however, that all the usual phase and other precautions may be taken to ensure perfect balance of the circuits.

Sinusoidal voltage S distributes to V5 and V6 amounts of current proportional to those entering V1 and V2, and, when wave-collector A1, P, A2 is so oriented that there is equal reception over A1 and A2, the average output currents of V5 and V6 will be equal. The time-constant filters shown at R, C are inserted in the output circuits of tubes V5 and V6 in order to give the mean currents a continuous shape. These currents thus flattened are applied respectively to plates Py, Py' of a cathode-ray indicator I in such a way that, when the output currents of V5 and V6 are equal, the spot will remain on line N. In order better to read the visual indication, the spot is given an alternate vertical deflection, by means of a sinusoidal voltage applied through transformer X—X to plates Px, Px' of the oscillograph. The indication thus obtained is a line T when there is equal reception over antennas A1 and A2.

When there is a difference in the reception over antennas A1 and A2, hence in the output currents of tubes V5 and V6, line T will be displaced towards the right or towards the left; thus, by orienting wave-collector assembly A1, P, A2 in the direction of the wave sought, an indication T' will be obtained that will be displaced on the screen and pass by line N the moment the airplane or other moving body towards which a brief-signal wave is directed and which reflects it back finds itself on the axis of collector A1, A2, P.

It should be understood, naturally, that the control of the input-and output-tubes V1, V2 and V5, V6 of the amplifier system can be obtained in a different way than through the use of a sinusoidal voltage on the screen-grids of these tubes in order to assure their alternate operation. These tubes may be of some other than the screen-grid type and may be controlled by deflection of the electronic beam, by cutting off the control grid, etc.

It is likewise obvious that the curves of Fig. 2 are given only by way of illustration and that the variations shown in that figure may be of other shapes.

Such a direction-determining device may be combined with a second similar one so as to find out the two space-planes on which the obstacle is located, while the distance will be taken on a third cathode-tube through examination of the pulses on a time base.

However, such a direction- and distance-metering arrangement comprising a transmitter and two receivers will not be convenient in all cases, owing to the space taken up by the devices. That is why, according to certain of its features, the invention provides more simple and less bulky arrangements for performing such radioelectric goniotelemetric operations. An example of such an arrangement is shown schematically in Fig. 3.

In that figure, an assembly N of transmitter-collector antennas of any suitable structure whose instantaneous orientation is indicated at F is driven continuously by a motor M at relatively low speed, for example one revolution about every three seconds. Motor M simultaneously controls a distributor A which applies circular-scanning sinusoids over wires S1 and S2 in quadrature to the pairs of deflecting-plates Px, Px' and Py, Py', respectively, of a cathode-ray indicator I, so that the lines ON, OE, OS and OW on the screen of tube I will correspond respectively to the north, east, south, and west directions in space. The cathodic spot thus describes a circle V on the screen of cathode ray tube I.

At each turn of the antennas and of the spot, which follows in synchronism, there is produced a short pulse emitted by N and generated by a pulse-sender G but which may be of any suitable known type and which controls at once the emission of pulses by antenna system N and the return to zero of the linear time-base of a second cathode ray oscillograph I' used for measuring distances.

The pulse emitted at each turn is sent out exactly at one turn plus a fraction of a turn; that is, if the emission pulse appeared on the screen of cathode-ray tube I, it would be seen through successive appearances at T1, T2, T3, etc., the spot making the complete turn of circle V in 3 seconds.

However, the pulse cannot appear unless it is reflected back by an obstacle and amplified by pulse-receiver R, i. e., when it encounters an obstacle such as an airplane, for example. Receiver R may also consist of any other structure suitable for the reception of pulses.

Since the pulse is repeated several times for a small angular displacement of direction F, it returns, for a distance of 150 kilometers, in $1/1000$ of a second and appears well in the direction of propagation on the screen of tube I. If the antennas are not very directional, several pulses will be seen, the maximum of which will be at the precise angle of the bearing of the detected obstacle. Fig. 4 shows such an indication at T, the bearing angle being the angle $a$ made by the axis of the maximum pulse with line ON.

In order to cause this return pulse to appear on the screen of cathode ray indicator I, receiver R operates through radial modulation the supply B1 of cathode tube indicator I. The radial-modulation control of cathode tube I is shown in known form as being effected through a grid modulation of the cathode ray tube, supply circuit B1 supplying the various electrodes of the electron gun of cathode ray tube I through potentiometer $p$.

Receiver R at the same time controls another supply circuit (B2) for a second cathode ray tube (I'), on which the distance indications are read, this second tube being controlled by a linear modulation so as to allow in an easy manner, through the appearance of return pulses T' on its screen, the reading of the distance D on the distance-scale. Such a linear-scanning circuit is well known and requires no further detailed description.

It should be understood that the radial modulation whereby the pulses can be caused to appear on the screen of tube I is described only by way of example and that any other method of modulation may be used to furnish the desired indications of the return pulses. Likewise, the linear-scanning modulation of tube I' is merely illustrative.

For indicator tube I it is also possible to provide, if desired, a modification of the circular scanning, that is, a modification of the voltage shapes causing that scanning, in order to give the resultant image the desired shape. Likewise, on the grid of tube I may be provided a control voltage assuring the illumination of the spot, in such a way that circle V shall be extinguished and only the pulses appear on the screen.

Such a system thus makes possible continuous scanning of space with an indication of the distance of the obstacle as soon as it appears, and of the direction in which it lies. The evolutions of an obstacle may thus be watched and followed with respect to the radioelectric goniotelemetric station.

For reading-convenience, the two indicating devices may be mounted on one and the same chassis, as shown in Fig. 5, the assembly being attached to one of the ship's panels, for example, if the station is arranged to be mounted on board a moving body.

While the invention has been described in the case of certain specific embodiment examples, it is obvious that it is in no way limited thereto but that on the contrary it is capable of many modifications and adaptations without departing from its scope.

I claim:

1. A radio direction finding system comprising a pair of directional antennas in fixed relation to each other but orientably mounted so as to scan a predetermined field in space, means to separate the major portions of the field patterns of said antennas while permitting overlapping of said field patterns, a pair of vacuum tubes, means to connect one of said antennas to the grid of one of said tubes, means to connect the other of said antennas to the grid of the other of said tubes, means to operate said tubes alternately, an indicating device comprising a cathode ray tube, and means responsive to the difference in the outputs of said vacuum tubes to control the movement of the spot of the cathode ray tube in one direction.

2. A radio direction finding system comprising a pair of directional antennas mounted in fixed relation to each other and rotatable in the plane of the field patterns of said antennas so as to permit them to scan a predetermined field in space, means to separate the major portions of the field patterns of said antennas while permitting overlapping of said patterns, a first pair of tubes, means to connect one of said antennas to the grid of one of said tubes, means to connect the other of said antennas to the grid of the other of said tubes, operating control means to operate said tubes alternately, means to combine the outputs of said tubes in a common output circuit, means to detect the signal in said common output circuit, a second pair of tubes, means to apply the detected signal to the grids of both said second pair of tubes in parallel, means synchronized with said operating control means for said first pair of tubes to operate said second pair of tubes alternately, a cathode ray tube having a pair of deflecting plates, means to deliver the output of one of said second pair of tubes to one deflecting plate of said cathode ray tube, means to smooth the output of said tube so as to deliver a substantially constant voltage to said deflecting plate, means to deliver the output of the other of said second pair of tubes to the other deflecting plate, and means to smooth the output of said other tube so as to deliver a substantially constant voltage to said other deflecting plate.

3. A radio direction finding system in accordance with claim 2 in which the cathode ray tube is provided with a second pair of deflection plates and means for applying alternating voltage of a predetermined frequency between the second pair of plates.

4. A radio direction finding system in accordance with claim 1 further comprising means to control the movement of the spot of the cathode ray tube at a predetermined rapid rate in the other direction while the aforesaid means controls the movement in said one direction.

5. A radio direction finding system, comprising means to radiate pulses of electromagnetic waves, a directional antenna system rotatable in a given plane, receiving means responsive to the output energy of said antenna system, a first indicating device, means to control operation of said first device in one coordinate of a two coordinate system in accordance with the rotation of said antenna system, means to operate said first device in the other coordinate by the response of said received energy to indicate the direction of received energy, a second indicating device, means to control operation of said second device in one coordinate of a two coordinate system responsive to the radiation of a pulse of electromagnetic waves, and means to operate the second indicating device in the other coordinate by the response of said received energy.

6. A radio direction finding system, comprising means to radiate pulses of electromagnetic waves, a directional antenna system rotatable in a given plane, receiving means responsive to the output energy of said antenna system, a first cathode ray tube, means to control said tube in one coordinate of a two coordinate system in accordance with the rotation of said antenna system, means to operate said tube in the other coordinate by the response of said received energy, a second cathode ray tube, means to control operation of said second tube in one coordinate of a two coordinate system responsive to the radiation of a pulse of electromagnetic waves, and means to operate the second tube in the other coordinate by the response of said received energy.

RENÉ HARDY.

REFERENCES CITED

The following references are of record in the file of this patent:

UNITED STATES PATENTS

| Number | Name | Date |
|---|---|---|
| 1,961,319 | Willoughby | June 5, 1934 |
| 2,143,178 | Wright | Jan. 10, 1939 |
| 2,189,549 | Hershberger | Feb. 6, 1940 |
| 2,197,734 | Steinhoff | Apr. 16, 1940 |
| 2,416,088 | Deerhake | Feb. 18, 1947 |
| 2,422,361 | Miller | June 17, 1947 |

FOREIGN PATENTS

| Number | Country | Date |
|---|---|---|
| 542,634 | Great Britain | Jan. 21, 1942 |